United States Patent [19]

Chang et al.

[11] Patent Number: 5,615,237
[45] Date of Patent: Mar. 25, 1997

[54] TELECOMMUNICATIONS FRAMER UTILIZING STATE MACHINE

[75] Inventors: Sin-Min Chang, Taipei, Taiwan; Eugene L. Parrella, Shelton, Conn.

[73] Assignees: Transwitch Corp., Shelton, Conn.; Siemens Telecommunication Systems Ltd., Taiwan

[21] Appl. No.: 308,083

[22] Filed: Sep. 16, 1994

[51] Int. Cl.$^6$ .................................. H04L 7/00; H04J 3/06
[52] U.S. Cl. ........................... 375/368; 375/366; 370/513
[58] Field of Search ..................................... 375/366, 368, 375/372; 370/105.1, 105.4, 106, 102, 105.2, 105.3

[56] References Cited

U.S. PATENT DOCUMENTS

| | | | |
|---|---|---|---|
| 4,531,210 | 7/1985 | Perry | 370/105.1 |
| 4,763,341 | 8/1988 | Murphy | 375/368 |
| 4,974,225 | 11/1990 | Chenier et al. | 370/105.1 |
| 5,018,140 | 5/1991 | Lee et al. | 370/105.1 |
| 5,301,195 | 4/1994 | Hasegawa | 375/368 |

OTHER PUBLICATIONS

"Frame Alignment in a Digital Carrier System–A Tutorial" by Choi, IEEE Communication Magazine, Feb. 1990, pp. 47–54.

*Primary Examiner*—Young T. Tse
*Attorney, Agent, or Firm*—David P. Gordon

[57] ABSTRACT

A synchronizer for telecommunications signals includes a telecommunications interface for receiving bits of a telecommunications signal having a frame, an SRAM which stores bit-defined states for a plurality of bit locations in the frame, a state update lookup table for changing the states for a plurality of the frame bit locations of the SRAM based on a previous state and based on an incoming bit of the telecommunications signal, and frame location identification logic for determining the location of the overhead bit of the telecommunications signal frame based on the states of the plurality of bit locations. In a first embodiment, the SRAM is an x by y bit SRAM, where x equals the number of bits in the frame, and y is large enough so that the number of possible states $\leq 2^y$. In a second embodiment, the bit locations are divided into a plurality of subgroups or stages, and the SRAM is at least an Int (x/s) by y bit SRAM, where s is an integer greater than one which represents the number of stages of the state machine, and Int (x/s) is the quotient x/s rounded up. In the second embodiment, after the state of a bit location in a first stage reaches a predetermined value, the bits of an associated frame location are used for state updates in a second stage.

22 Claims, 7 Drawing Sheets

TELECOMMUNICATIONS FRAMER UTILIZING STATE MACHINE

BACKGROUND OF THE INVENTION

1. Field of the Invention

The present invention relates generally to a synchronizer for high speed telecommunications signals. More particularly, the present invention relates to a framer for DS1 telecommunications signals which reduces the amount of memory required for synchronization by utilizing a state machine.

2. State of the Art

The DS1 telecommunications signal is a well established standard in telecommunications in the United States as well as in other parts of the world. The DS1 signal is defined by standards ANSI T1.403-1989; ANSI T1.107-1988; ANSI-T1M1-3/93-005R1 April 1993 as a 1.544 MHz signal carried by a T1 trunk. The frame of the DS1 signal consists of one hundred ninety-three bits (each repeating at a rate of 8 kHz). One hundred ninety-two of the one hundred ninety-three bits are used to transmit twenty-four eight bit DS0 signals, while one other bit is used for DS1 "overhead". The overhead bit is typically used for synchronization purposes as well as for signalling synchronization and a maintenance channel.

Various formats are known in conjunction with DS1 signals, including the "D4 SF" or "superframe" format, the "SLC-96" format, and the "ESF" or "extended superframe" format. The SF and ESF formats are SONET (synchronous optical network) compatible. In the shperframe format, twelve frames of DS1 signals are utilized together to provide twelve overhead bits which are used for frame synchronization and signalling. In particular, every other (i.e., six) of the twelve overhead bits of the twelve frame superframe are used for frame synchronization, while the other six overhead bits are used for signalling synchronization, i.e., locating signalling bit location. The bit pattern of the frame synchronization bits (also called the Ft bits) is an alternating 010101 pattern. The signalling synchronization bits (also called the Fs bits), on the other hand, are provided with a 001110 pattern and are used to identify the sixth and twelfth DS0s of the frame, where one bit of the DS0 can be used for signalling. In the sixth frame, the signalling bit of the DS0 is known as the "A" bit, while in the twelfth frame, the signalling bit is known as the "B" bit. If there is no signalling, the six signalling synchronization bits of the superframe are not utilized. However, if there is signalling, the A and B bits provide either two state or four state signalling. In two state signalling which provides redundancy for error suppression and faster response, each B bit is set equal to an associated A bit (A=B). Thus, two states are present: 00, 11. In four state signalling, A and B are independent, and each can assume either the 0 or 1 values. Thus four states are present: 00, 01, 10, 11.

The SLC-96 format generally includes groupings of seventy-two DS1 frames. The synchronization (Ft) bits in the SLC-96 format utilize the same alternating bit pattern (010101) as used in the D4 SF format. However, the signalling synchroniation Fs bits are utilized differently. In particular, in SLC-96, the Fs bits of the first twenty-four frames and last twenty-four frames of the seventy-two frame superframe utilize the 001110 pattern and are signalling bits to identify the frames in which the A and B bits are located. However, the middle twenty-four Fs bits are used to send a control message. In addition, the A and B bits of the SLC-96 format provide for nine state signalling with the A and B bits being independent and assuming either a pattern of all zeros, all ones, or alternating zeros and ones.

The ESF format utilizes a superframe of twenty-four DS1 frames. Of the twenty-four overhead bits, six bits are used for frame synchronization, six bits are used for error checking (CRC-6), and twelve bits are used for a data channel. The six frame synchronization bits are distributed over the twenty-four frames and assume the pattern 001011.

Regardless of the format utilized, large buffers have been used in the art to synchronize the receiving apparatus to the incoming DS1 frame. As data is received, the DS1 signal is placed in the buffer which is one hundred ninety-three bits wide and at least eight bits deep (e.g., a 193×8 dual port RAM). In fact, for the SLC-96 and ESF formats, the buffers of the art have been at least twenty-four bits deep. After the data fills the buffer, each of the one hundred ninety-three columns of data are scanned to determine whether they contain the expected eight-, or twenty-four bit pattern of overhead data, and the column containing the expected overhead format is then identified as the overhead location in the data frame. It should be appreciated that in matching the data in the buffer column to the expected pattern of overhead data, either different phases of the expected pattern must be compared to the data present in each column, or different phases each column must be compared to the expected pattern. Regardless, even after the overhead location of the data frame is found, data is continually sent to the buffer, and pattern of the bits of the expected overhead location is checked to establish that the frame synchronization has been maintained.

While the framing techniques of the prior art establish frame relatively accurately and quickly, they require a large amount of buffer memory. In integrated circuits, large amounts of memory takes up valuable real estate on the silicon chip, and resultingly either limits the other functions available on the chip, or increases the size of the chip, thus increasing the cost of the chip. This is particularly true when synchronization is required in multi-channel applications such as multi-DS1 customer premise equipment (CPE) and SONET.

SUMMARY OF THE INVENTION

It is therefore an object of the invention to provide a synchronizer for telecommunications applications which uses a limited amount of memory.

It is another object of the invention to provide a synchronizer for telecommunications applications which frames accurately and quickly.

It is a further object of the invention to provide a telecommunications synchronizer which utilizes a finite state machine for framing.

It is an additional object of the invention to provide a synchronizer for telecommunications applications which utilizes a multi-stage state machine for framing.

In accord with the objects of the invention which will be discussed in more detail below, the synchronizer of the invention generally comprises telecommunications interface means for receiving bits of a telecommunications signal having a frame, a memory storage means (RAM) which stores bit-defined states for a plurality of frame locations, state update means for changing the states in each of said plurality of frame locations of the memory storage means based on a previous state and based on an incoming bit of said telecommunications signal, and frame location identification means for determining the location of the overhead bit of the telecommunications signal frame based on the states of the plurality of frame locations. In a first embodiment, the memory storage means is an x by y bit silicon RAM, where x equals the number of bits in the frame, and y is large enough so that the number of possible states $\leq 2^y$ and the state update means is a look-up chart which relates an old state and an input to a new state. In a second embodiment, the frame locations are divided into a plurality of subgroups or stages, and the memory storage means is at least an Int[x/s] by y bit RAM, where s is an integer greater than one which represents the number of stages of the state machine, and Int[x/s] is the quotient x/s rounded up. In the second embodiment, after the state of a frame location in a first stage reaches a predetermined value, the bits of an associated frame location are used for state updates in a second stage of the state machine. Regardless of the number of stages that are utilized, the preferred frame location identification means generally comprises a timer and a comparator. Ideally, after enough time has transpired (as clocked by the timer), the state of all but one of the frame locations of the memory will be equal, with the state value which is not equal to the others indicating the location of the frame overhead bit. In other words, as a determination is made that a frame location cannot be the location of the frame overhead bits, the state of that frame location will be updated to a terminal or final value. The frame location which continues to be updated to the non-final value will be the frame location containing the overhead bits of the frame.

According to a preferred aspect of the invention, a fast clock is utilized to permit the fetching of the current state of a bit position from the RAM, the calculation of the next state based on the value of the data bit received as well as from the old state, and the putting the new state of the bit position back into the RAM all within a single 648 nanosecond DS1 clock cycle. In accord with other preferred aspects of the invention, in the superframe mode where Fs and Ft bits are used, a 193×4 bit RAM is utilized in a one stage arrangement to find either the repeating Fs pattern 001110 or the repeating Fs/Ft pattern 100011011100, while in the ESF mode, a 193×5 bit RAM is utilized in a four stage arrangement to find the repeating 001011 frame synchronization bits.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
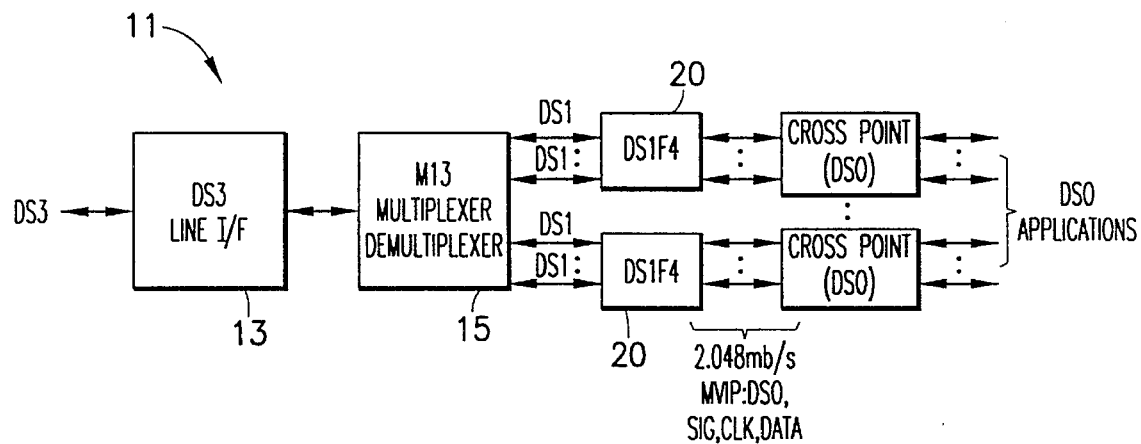
FIG. 1 is a high level block diagram of a DS0-T3 multiplexer incorporating the framer and synchronizer of the invention.

Turning to FIG. 1, a DS0-T3 multiplexer 11 which represents a typical multichannel T1 application is shown. The DS0-T3 multiplexer 11 includes a DS3 line interface 13 which interfaces the multiplexer with a DS3 line (i.e., receives and transmits a DS3 telecommunications signal), a M13 multiplexer 15 which multiplexes twenty-eight DS1 telecommunication signals into a DS3 signal and demultiplexes a DS3 signal into twenty-eight DS1s, and a plurality of DS1 framers 20 for demultiplexing each DS1 into twenty-four DS0 s and for multiplexing twenty-four DS0s into a DS1. As shown in FIG. 1, the DS1 framers are entitled DS1F4, as it is preferred that each framer be a four channel framer, thereby lowering the parts count in the system. It will be appreciated, however, that for purposes of the invention, the DS1 framer could include different numbers of channels (e.g., 1, 2, 4, 7, 14).

Figure 2:
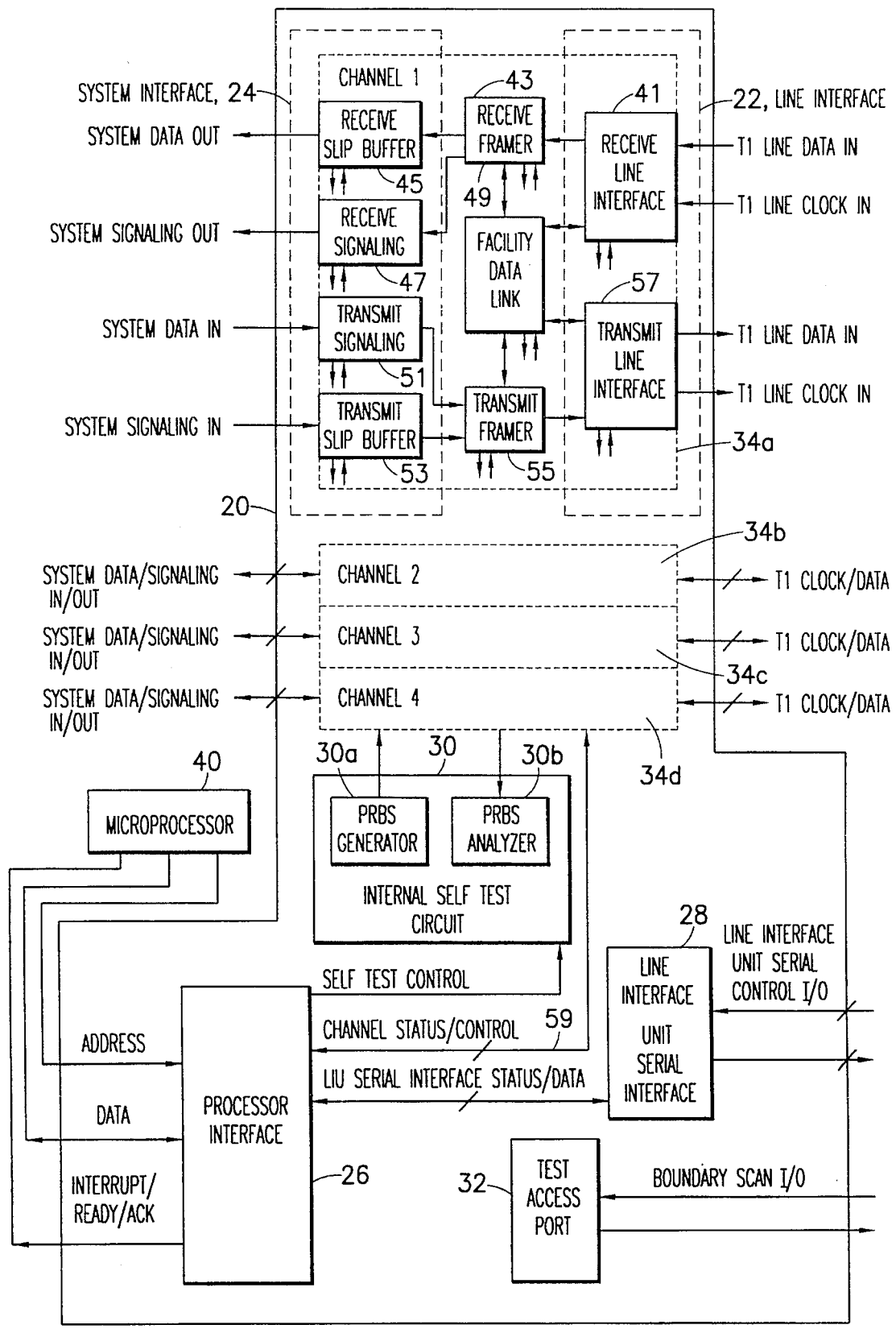
FIG. 2 is a block diagram of the framer of the invention shown in FIG. 1.

A block diagram of the DS1 framer 20 of the invention is seen in FIG. 2. The DS1 framer 20 broadly includes a line interface 22, a system interface 24, a processor interface 26, a line interface control 28, an internal self-test circuit 30, a test access port 32 and, four channel blocks 34a, 34b, 34c, 34d. As suggested in FIG. 2, each channel block has its own set of circuits. Thus, while the blocks of channel one are shown, the other channel preferably include identical blocks. As indicated, channel block 34a includes a receive line interface 41 which is part of the line interface 22, a receive framer 43, a receive slip buffer 45 which is part of the system interface 24, a receive signalling block 47 which is also part of the system interface 24, a facility data link 49, a transmit signalling block 51 and a transmit slip buffer 53 (both part of system interface 24), a transmit framer 55, and a transmit line interface 57 (part of line interface 22). As indicated by the arrows entering and leaving each element of the channel block, each element of the channel block is preferably coupled to a microprocessor 40 via the channel status/control line 59 and through the processor interface 26.

The receive line interface 41 converts a dual rail line coded DS1 into a digital data bitstream. Where alternative mark inversion (AMI) coding is used, the line interface converts a high pulse on the positive or negative input rail into a logic one and the absence of pulses into a logic zero. The interface also verifies that high pulses alternate from the positive to the negative rail. When successive pulses occur on the same rail, the interface reports the event as a line error to the system processor 40. Where B8ZS code is used, the line interface converts data as in AMI mode, except that valid zero substitution sequences (with embedded AMI code violations) are converted into strings of zeros. The block also detects the DS1 alarm indicator signal (AIS), an all one signal, and the DS1 loss of signal alarm (LOS) which is an all zeros signal. The block also optionally detects the SF DS-1 Yellow alarm which is transmitted by zeroing bit two of every DS0 voice/data channel.

As will be discussed in much more detail hereinafter, the receive framer 43, which is coupled to the receive line interface 41, finds the DS1 frame position in the digital data bitstream created by the receive line interface 41. It also detects frame bit errors and initiates a new frame position search when a threshold of frame bit errors is crossed.

Coupled to the receive framer 43 is the receive slip buffer 45. The receive slip buffer 45 is a circular buffer which dejitters the DS1 data by buffering two complete payloads of DS1 data. The data is clocked out onto a data bus (System Data Out) by a receive side clock which is not phase related to the T1 clock and which may differ in frequency. The buffer allows the read and write pointers to close upon one another to within a certain range. Once the pointers are within this minimum range, they are forced apart by a frame synchronous slip. The frame synchronous slip can cause a frame of data to be either repeated or skipped. If data is filling the buffer, a frame will be skipped by waiting until the receive side finishes reading out the current frame, and then jumping the read pointer by a full frame (twenty-four bytes). On the other hand, if the buffer is emptying, a frame will be repeated by moving the write pointer ahead by twenty-four bytes. The data read from the receive slip buffer is serialized and driven onto a serial data output at 1.544 Mbits/sec with clock and sync outputs to permit demultiplexing of the twenty-four individual voice/data channels (DS0s) in the payload.

The receive signalling block 47 is also coupled to the receive framer 43, and is used to extract the eighth bit of every DS0 voice/data channel every sixth frame of a D4 SF signal as described in the Background section hereof. The signalling data is demultiplexed from each channel and stored in a signalling buffer. The data is then read from the buffer and put out in serial form on a serial signalling output bus (System Signalling Out) along with AIS and yellow alarm information.

The transmit portion of the channel block 34a effectively conducts inverse operations than those described above with reference to the receive portion of the channel block. Thus, the transmit signalling block 51 takes a signalling input (System Signaling In) and inserts the signalling into the eighth bit of every DS0 voice/data channel in the sixth frame of each superframe. The signalling input also provides AIS and Yellow alarm information which may be selectively enabled to the T1 line (T1 Line Data In).

The transmit slip buffer 53 is a circular buffer which dejitters DS1 data in a fashion similar to the receive slip buffer 45. Use of a transmit slip buffer is desirable because the system interface on the transmit side may be driven by a device which desynchronizes the DS1 from a higher rate signal such as a T3 or SONET STS-n signal. Desynchronization is a demultiplexing technique which produces a lower rate signal with a jittered clock from a higher rate signal.

Coupled to the transmit signalling block 51 and the transmit slip buffer 53 is a transmit framer 55 which inserts a frame pattern and multiplexes the facility data link messages into the signal output onto the line. Coupled to the transmit framer 55 is the transmit line interface 57. The transmit line interface 57 creates AMI or B8ZS coded dual rail DS1 signals for input to an off-chip line interface transceiver (not shown) which creates the electrically compatible T1 signal which is directly wired to a T1 line. The AMI signal is created by alternating the pulse position for ones in the data stream from positive to negative rails. The B8ZS signal is created in a similar fashion, but sequences of eight zeros are searched for and substituted with the B8ZS substitution sequence. The line interface 57 is also responsible for AIS (all ones) signal and all zeros signal transmission. The line interface 57 loops back the transmit side to the receive side under control of the processor 40.

The facility data link 49 is used in conjunction with ESF signals, and receives and transmit maintenance messages over the 4 Kbps ESF facility data link. Bits are demultiplexed from the channel and high level data link control (HDLC) protocol information is stripped away. The bits are then formatted into bytes and written to a FIFO which is readable by the microprocessor. The controller verifies the data cyclic redundancy check (CRC) codes at the end of each message and provides status and interrupts back to the microprocessor 40. On the transmit side, a FIFO writable by the microprocessor is read by the controller. The data is formatted into the HDLC format, and a CRC code is calculated and appended to the message which is then transmitted over the link.

The processor interface 26 couples to the system processor 40 and allows access and control for each of the four DS1 receive framers 43. Alarm information detected by the framers can be read as current status and latched in event registers. Either the arrival or the departure of a condition can be individually enabled to setting the event register. To facilitate either interrupt or polled systems, global interrupt masks, per channel interrupt masks, global event and global polling registers are provided. To assist in the collection of performance parameters, shadow registers and counter latching are provided. The configuration of each framer (for D4SF, ESF, or other framing) is also provided by the processor interface 26 as well as control of the facility data link block for each framer. The line interface control block 28 is also controlled by the processor interface 26. The address bus coupled to the processor interface 26 is a twelve bit input port while the data bus is an eight bit bi-directional three state port.

The line interface control 28 is a serial port which allows the microprocessor 40 to control the off-chip line interface unit (not shown). The test access port 32 implements IEEE 1149.1 boundary scanning. The internal self-test circuit 30 includes a pseudo-random bit sequence (PRBS) generator 30a which allows a pseudo-random bits sequence to be substituted for the system side data input on any one or all of the four channels. The data may then be sent through the transmit side, looped back to the receive side and sent through the receive side back to the system interface. The self-test circuit 30 also includes a PRBS analyzer 30b which can be linked to any one channel's system receive side and which outputs a lock signal which indicates bit sequence correctness.

Figure 3:
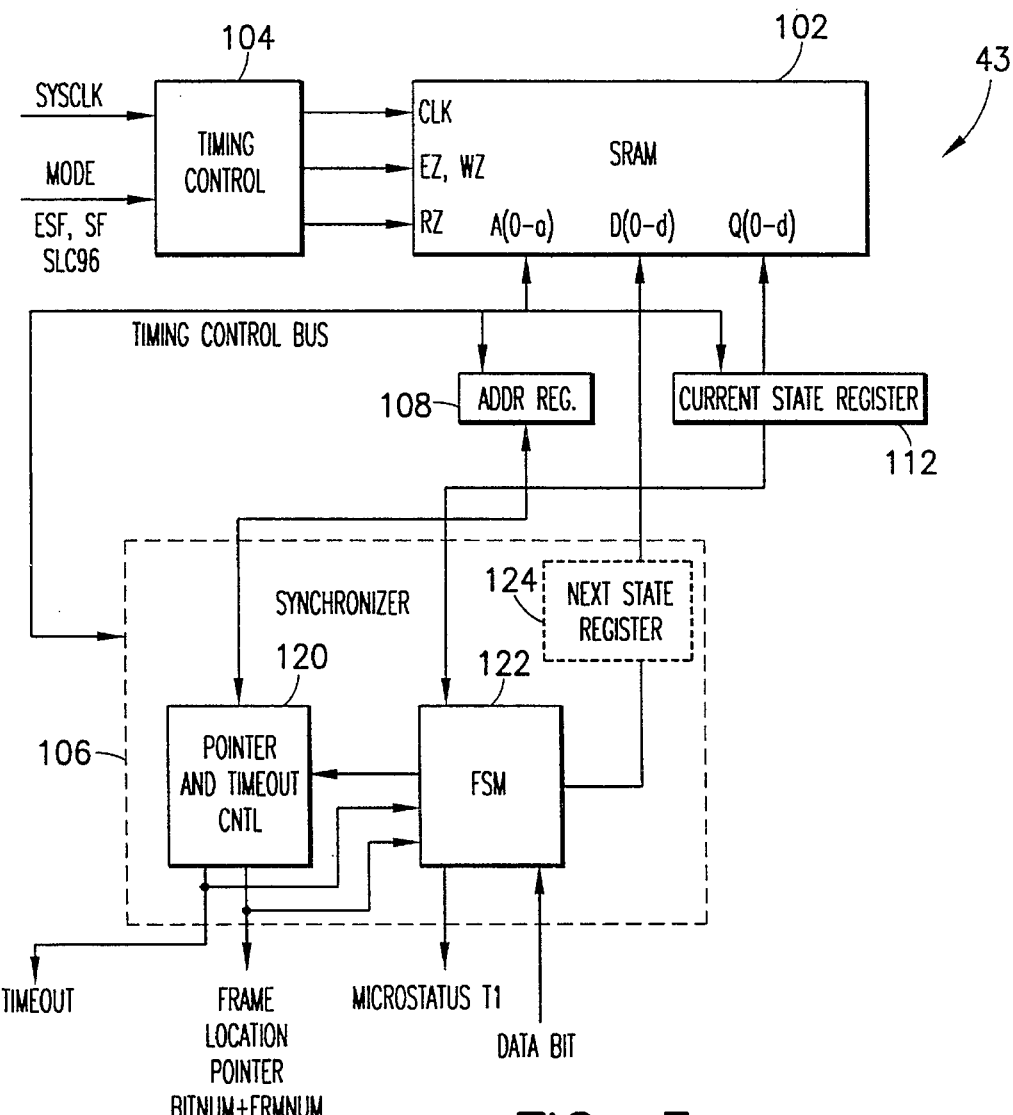
FIG. 3 is a block diagram of the synchronizer incorporated in the framer of FIG. 2.

A block diagram of the receive framer 43 of the channel block 34a is seen in FIG. 3. The receive framer 43 is seen to include a static RAM (SRAM) 102, a timing control block 104, a synchronizer 106, an address register 108, and a current state register 112. The synchronizer 106 includes a pointer controller 120, a finite state machine 122, and a virtual next state register 124. The data flow into and out of the receive framer 43 is essentially as follows. Incoming T1 data from the receive line interface is provided to the finite state machine 122 via lead NRZDT. In response to the receipt of a bit of data, the finite state machine 122 causes the pointer controller (which for D4SF is typically a mod 193 counter) to pulse (i.e., increase its count) and simultaneously activates the data lines of the SRAM 102. Pulsing of the counter 120 causes the address register 108 to read the count of the counter 120 and activate the address lines of the SRAM 102. The data (state) at the indicated address (state machine) of the SRAM 102 is then read into the current state register 112 which provides a current state to the finite state machine (state update means) 122 (preferably implemented as a look-up table) as discussed in more detail hereinafter. The bit value provided to the finite state machine, together with the current state indicated in the current state register 112 are then used by the finite state machine to generate the next state which is read (via the next state register 124 if desired) into the indicated location of the SRAM 102. Thus, a read/modify/write operation is conducted.

Figure 4:
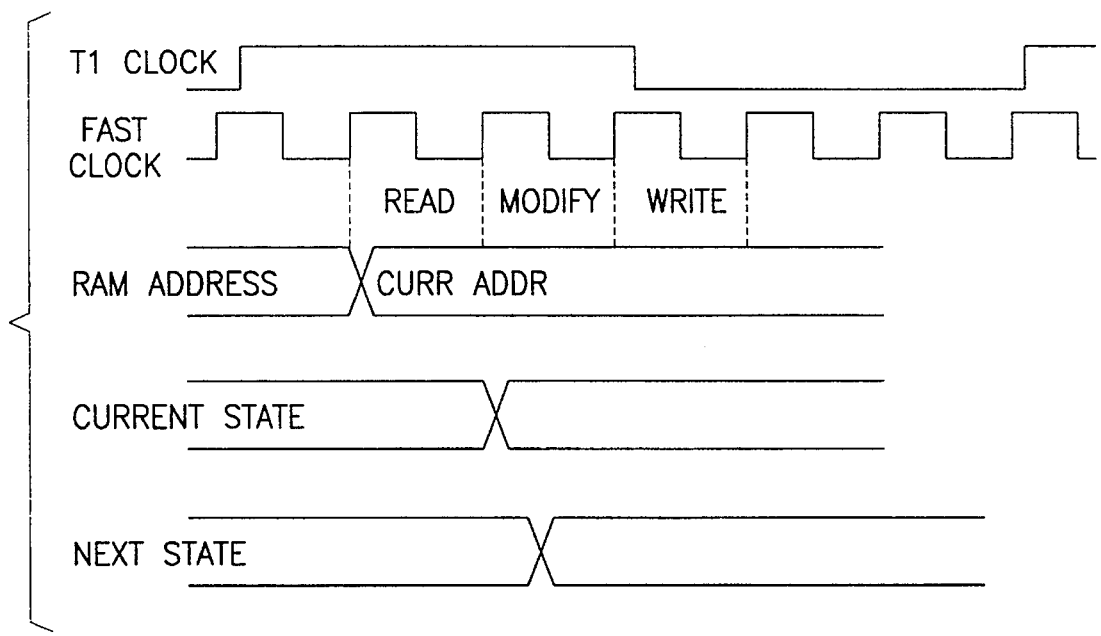
FIG. 4 is a timing diagram showing the updating of state in the state machine during a DS0 time slot.

It should be appreciated that the read/modify/write operation is conducted within a single T1 bit clock. In order to implement the operation, a fast clock provided by the timing control block 104 (and typically available in conjunction with the microprocessor) is used for controlling the timing of the read/modify/write operation. The timing of the operation is seen in detail in FIG. 4. In particular, at the rising edge of the T1 clock, when a bit is being received, the pointer and address registers are already updated. Then, during the next fast clock cycle, the current state at the indicated address is read. During the next fast clock cycle, the current state is modified (i.e., the next state is calculated) based on the value of the incoming bit and the state of the current state. The next fast clock cycle is then used for writing the new or next state into the same address of the SRAM. After the new state is written into the address of the SRAM, the pointer and address registers are updated.

Figure 5:
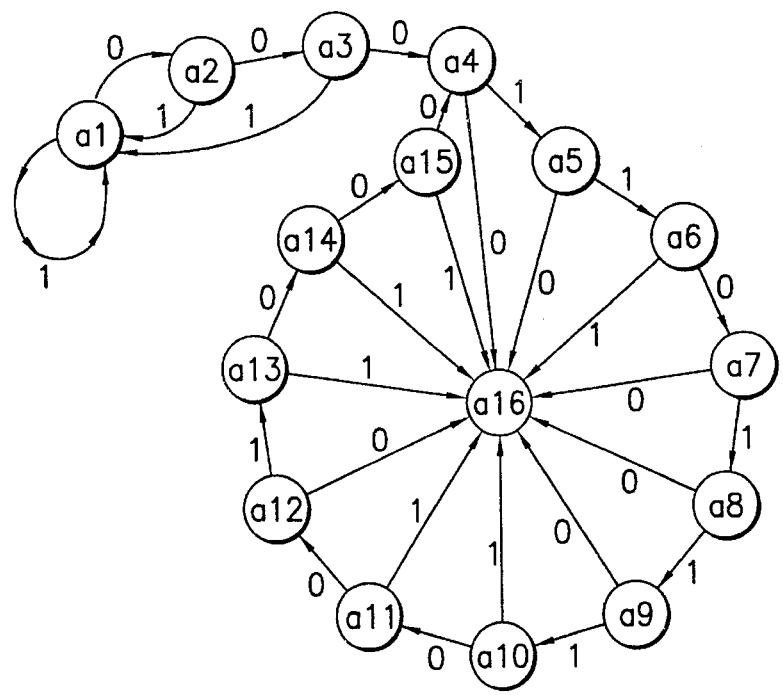
FIG. 5 is a state update diagram showing the updating of states in a superframe for an Fs/Ft pattern.

Turning now to FIG. 5, a state update diagram showing the updating of states in a superframe for an Fs/Ft pattern is seen. The state update diagram is carried out by the state machine of the DS1 framer 20. By definition, the state machine has an existing state, and uses an input and the existing state to provide one or both of an output and an updated state. For purposes of the invention, the updated state is the output of the state machine which is of interest. In the preferred embodiment of FIG. 5, sixteen states (a1–a16) are possible. State a1 is the starting state of the state machine. When a bit of value 1 is received, and the state machine is in state a1, the state machine remains in state a1; i.e., the updated state is the same as the previous (or existing) state. If bits of value 1 continue to be received by the state machine, in the preferred embodiment of the invention, the state machine remains in state a1 until a "time-out" is received. When a time-out is received, and the state machine is still in state a1, the state is updated to state a16 (the terminal non-framing bit state). On the other hand, if no time-out is received and a bit of value 0 is received, the state machine is updated from state a1 to state a2. As will be discussed in more detail hereinafter, when the state machine is in either of states a2 or a3, if a bit of value 1 is received, the state is updated to state a1 in order to account for phase differences. On the other hand, if the state machine is in state a2, and a bit of value 0 is received, the state of the state machine is updated to state a3. Likewise, when in state a3, if a bit value 0 is received, the state is updated to state a4. When in state a4, if a bit of value one is received, the state is updated to state a5. However, if a bit of value zero is received, the state is updated to terminal state a16. As will be appreciated by reference to FIG. 4, state a5 is updated to state a6 if a bit of value one is received, and to terminal state a16 otherwise. State a6 is updated to state a7 if a bit of value zero is received and to terminal state a16 otherwise. State a7 is updated to state a8 by a bit of value one, and to terminal state a16 otherwise. The state updating continues with state a8 being updated to state a9 by a bit value one, and to terminal state a16 otherwise. State a9 is updated to state a10 by a bit value one and to terminal state a16 otherwise. State a10 is updated to state a11 by a bit value zero, and to state a16 otherwise, while state a11 is updated to state a12 by a bit value zero, and to state a16 otherwise. In Japanese systems, update from state a11 to state a12 occurs regardless of bit value due to the reuse of this frame bit for "yellow alarm" transmission and reception. State a12 is updated to state a13 by a bit value one and to state a16 otherwise. State a13 is updated is updated to state a14 by a bit value zero and to state a16 otherwise. State a14 is updated to state a15 by a bit value zero and state a16 otherwise. State a15 is updated to state a4 by a bit value zero, and to terminal state a16 otherwise.

It should be appreciated by those skilled in the art that the state machine which is receiving the Fs/Ft framing bit pattern 100011011100 will proceed from state a1 through to state a15, will return to state a4 from state a15, and will circularly repeat the progression from state a4 through state a15 and back to state a4 as long as the Ft and Fs bits are being received as the bit inputs to the state machine. Thus, at any given time used to determine whether a state machine is receiving the framing bits, if the state machine is any of states a4 through a15, it is possible that the framing pattern is being received by that state machine. Thus, if desired, a flag bit can be utilized to indicate that a state machine has reached state a15. Thus, such a state machine would be recognized as containing the framing bits only, if upon inspection, its flag is raised, and it is presently in any of states a4 through a15. Alternatively, and as discussed in more detail hereinafter with respect to FIG. 10, upon reaching state a15, the state machine increments a counter which is utilized to indicate how many of the state machines have reached state a15 and are not at terminal state a16. When the counter, after at least an initial amount of time (e.g., three milliseconds) reaches the value one, the state machine which is not at the terminal state is determined to contain the framing bits.

It should also be appreciated that the framing bits when first received can be at any phase. Thus, rather than receiving the bits as 100011011100, the bits might start anywhere in the twelve bit pattern. In order to account for this, as previously set forth, states a2 and a3 can be updated to state a1 in certain circumstances. In particular, since the receipt of a first bit value zero updates the state machine from state a1 to state a2, account must be made that the zero can be any of the six zeros of the framing pattern. If the zero is the first of the three zero group of the framing pattern, the state machine will proceed from state a1 through state a15 as described above. However, if the zero is the second of the three zeros of the framing pattern, the state machine will proceed from state a1 to state a2 upon receiving the first zero, to state a3 upon receiving the next zero, and then return back to state a1 upon receiving a bit value one. The state machine will then consecutively stay in state a1, move to state a2, move back to state a1, stay in state a1, continue to stay in state a1, move to state a2, move to state a3, and move back to state a1 upon receiving bits 1,1,0,1,1,1,0,0 before proceeding through states a2–a15.

If the zero received when in state a1 is the third of the three zero group of the framing pattern, a similar sequence will be followed, except that instead of proceeding from state a1 to state a2 to state a3 before returning to state a1, the state machine will only progress to state a2 before returning to state a1. Similarly, if the zero received when in state a1 is the zero between the two groups of ones, the state machine will move from state a1 to state a2 upon receiving the zero, and then consecutively move back to state a1, stay in state a1, continue to stay in state a1, move to state a2, move to state a3, and move back to state a1 upon receiving bits 1,1,1,0,0 before proceeding through states a2–a15. Further, if the zero received when in state a1 is the next to last zero of the framing pattern, the state machine will move from state a1 to state a2, from state a2 to state a3, and then back to state a1 before proceeding through states a2–a15. Similarly, if the zero received when in state a1 is the last zero of the framing pattern, the state machine will update from state a1 to state a2 and then back to state a1 before proceeding through states a2–a15.

In Fs/Ft framing, all sixteen states a1–a16 can be represented with four bits. Thus, in the preferred embodiment, the SRAM utilized to store the states for each DS1 signal is an 193×4 SRAM. Alternatively, with proper addressing, a 97×8 SRAM can be utilized by "folding over" the SRAM, with the address bus addressing one four bit nibble at a time. Similarly, with proper addressing, a 49×16 SRAM could be utilized. If desired, in order to reduce the extremely unlikely possibility of a false framing indication, additional states which would result in the requirement of a bigger SRAM (e.g., 193×5) can be utilized in conjunction with the a1, a2, and a3 states such that certain bit sequences (e.g., 0101; 1111; 111000) which would otherwise cause cycling within a1, a2, and a3 will cause movement to the terminal state a16.

Figure 6:
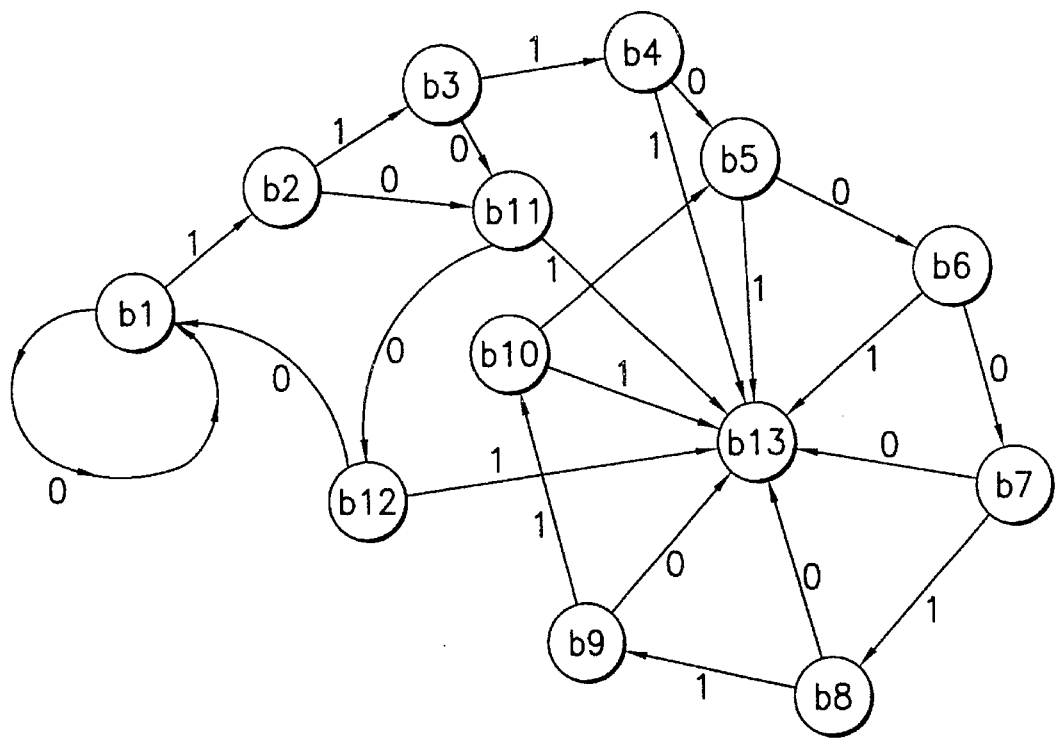
FIG. 6 is a state update diagram showing the updating of states in a superframe for an Fs only pattern.

FIG. 6 is a state update diagram showing the updating of states in a superframe for an Fs only pattern. As indicated in FIG. 6, the preferred state machine admits thirteen states (b1–b13) which can be represented by four bits. As set forth above, the Fs superframe pattern is 001110. Thus, state b1 is the starting state of the state machine. When a bit of value 0 is received, and the state machine is in state b1, the state machine remains in state b1; i.e., the updated state is the same as the previous (or existing) state. If bits of value 0 continue to be received by the state machine, the state machine remains in state b1 until a "time-out" is received. When a time-out is received, and the state machine is still in state b1, the state is updated to state b13 (the terminal non-framing bit state). On the other hand, if no time-out is received and a bit of value 1 is received, the state machine is updated from state b1 to state b2. As will be discussed in more detail hereinafter, when the state machine is in either of states b2 or b3, if a bit of value 0 is received, the state is updated to state b11 in order to account for phase. On the other hand, if the state machine is in state b2, and a bit of value 1 is received, the state of the state machine is updated to state b3. Likewise, when in state b3, if a bit value zero is received, the state is updated to state b11, while if a bit value one is received, the state is updated to state b4. When in state b4, if a bit of value zero is received, the state is updated to state b5. However, if a bit of value one is received, the state is updated to terminal state b13. As will be appreciated by reference to FIG. 6, state b5 is updated to state b6 if a bit of value zero is received, and to terminal state b13 otherwise. State b6 is updated to state b7 if a bit of value zero is received and to terminal state b13 otherwise. State b7 is updated to state b8 by a bit of value one, and to terminal state b13 otherwise. The state updating continues with state b8 being updated to state b9 by a bit value one, and to terminal state b13 otherwise. State b9 is updated to state b10 by a bit value one and to terminal state b13 otherwise. State b10 is updated to state b5 by a bit value zero, and to state b13 otherwise.

It should be appreciated by those skilled in the art that the state machine which is receiving the Fs framing bit pattern 011100 will proceed from state b1 through to state b10, will return to state b5 from state b10, and will circularly repeat the progression from state b5 through state b10 and back to state b5 as long as the Fs bits are being received as the bit inputs to the state machine. Thus, at any given time used to determine whether a state machine is receiving the framing bits, if the state machine is any of states b5 through b10, it is possible that the framing pattern is being received by that state machine. Thus, if desired, a flag bit can be utilized to indicate that a state machine has reached state b10. Thus, such a state machine would be recognized as containing the framing bits only, if upon inspection, its flag is raised, and it is presently in any of states b5 through b10.

It should also be appreciated that the framing bits when first received can be at any phase. Thus, rather than receiving the bits as 011100, the bits might start anywhere in the six bit pattern. In order to account for this, as previously set forth, states b1, b2, and b3 can be updated to different states in certain circumstances. Thus, if the first bit received is a zero, it could be any of the first, second, and third zeros of the six bit pattern. If it is the second or third zero, recirculation in state b1 will be required before progressing to states b2, b3, b4, etc. Likewise, if the first bit received is a one, the one could be any of the first, second, and third ones of the six bit pattern. If it is the first one of the pattern, the state machine will proceed directly through states b2, b3, b4, etc. However, if it is the second one of the pattern which is initially received, then the state machine will proceed to be updated through states b2, b3, b11, b12, and b1 upon receiving bit values 1,1,0,0,0 before continuing sequentially through states b2–b10. Similarly, if it is the third one of the pattern which is initially received, then the state machine will proceed to be updated through states b2, b11, b12, and b1 upon receiving bit values 1,0,0,0 before continuing sequentially through states b2–b10.

Figure 7:
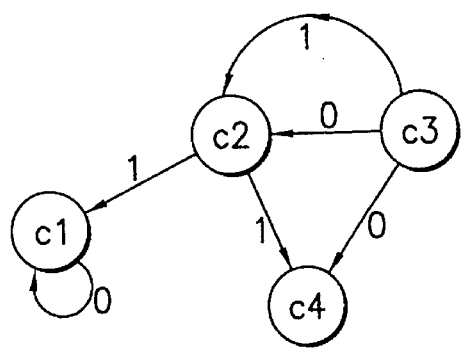
FIG. 7 is a state update diagram showing the updating of states in a superframe for an Ft only pattern.

The update diagram for the updating of states in a superframe for an Ft pattern only is seen in FIG. 7. As described above, the Ft pattern is a simple 1010 pattern which can be identified by a four-state state machine. Thus, for a DS1 framer utilizing a superframe with the Ft pattern only, the states can be stored in a 193×2 SRAM. The starting state is state c1. If the state machine receives a bit value zero, state c1 is recirculated (i.e., updated to itself) until a time-out is received. However, if a bit value one is received, state c1 is updated to state c2. From state c2, if a bit value zero is received, the state of the state machine is updated to state c3, while if a bit value one is received, the state is updated to terminal state c4. From state c3, if a bit value zero is received, the state machine is updated to terminal state c4. However, if a bit value one is received, the state is updated by returning to state c2. If the 1010 . . . framing pattern is being received, the state machine will continue to cycle by alternating between state c2 and state c3.

Figure 8A:
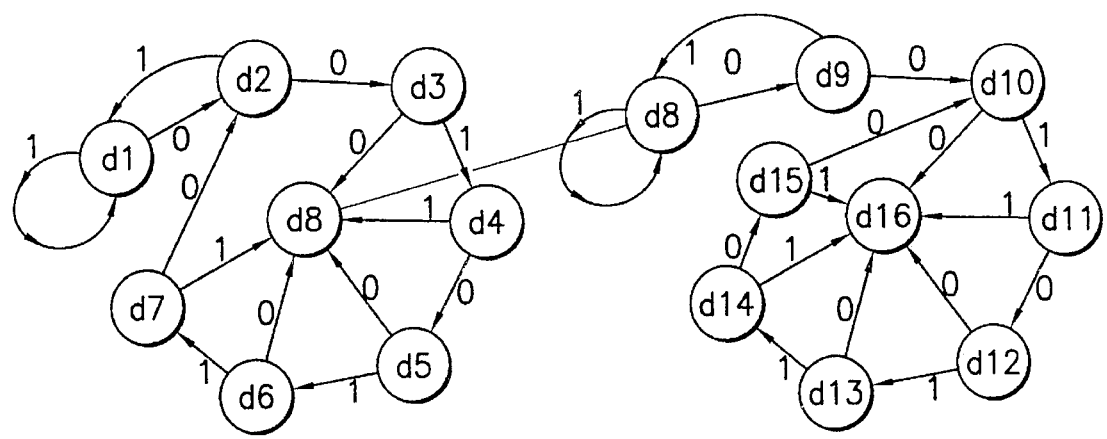
FIG. 8a is a state update diagram showing a first embodiment of the updating of states in a two stage implementation for the ESF frame.

Turning now to FIG. 8a, a state update diagram showing the updating of states in a preferred embodiment of a two stage implementation for the ESF frame is seen. As set forth above, the framing pattern for the ESF frame is 001011, with one bit being received every four DS1 frames. Utilizing an eight-state state machine, if a single stage were to be employed as described above with reference to FIGS. 5–7, a 772×3 bit SRAM would be required, as three bits are required to represent the eight possible states, while 772 addresses are required as a framing bit is received only once every 772 bits (i.e., 4 DS1 frames). In order to reduce the size of the SRAM to e.g., 386×4, a two stage arrangement is utilized. In particular, 386 eight-state state machines are provided and run, with bits from two DS1 frames being consecutively provided as inputs to the three hundred eighty-six state machines. The first embodiment of the state machine update arrangement is seen in FIG. 8a. The starting state is d1. If a state machine receives a bit value one, state d1 recirculates. However, if a bit value zero is received, the state is updated to state d2. In order to accommodate phases, while in state d2, if a bit value one is received, the state machine is updated by returning to state d1. However, if a bit value zero is received, the state machine is updated to state d3. From state d3, if a bit value one is received, the state machine is updated to state d4, while if a bit value zero is received, the state machine is updated to first stage terminal state d8. From state d4, if a bit value zero is received, the state machine is updated to state d5, while if a bit value one is received, the state machine is updated to first stage terminal state d8. While in state d5, if a bit value one is received, the state machine is updated to state d6; otherwise, updating is to the first stage terminal state d8. From state d6, the state machine is updated to state d7 upon receiving a bit value one, and to first stage terminal state d8 upon receiving a bit value zero. From state d7, if a bit value zero is received, the state machine updates by returning to state d2, while if a bit value one is received, the state machine is brought to the first stage terminal state d8. It should be appreciated by those skilled in the art that the state machine which is receiving the ESF framing bit pattern 001011 will proceed from state d1 through to state d7, will return to state d2 from state d7, and will circularly repeat the progression from state d2 through state d7 and back to state d2 as long as the framing bits are being received as the bit inputs to the state machine. Thus, at any given time used to determine whether a state machine is receiving the framing bits, if the state machine is any of states d2 through d7, it is possible that the framing pattern is being received by that state machine. Thus, if desired, a flag bit can be utilized to indicate that a state machine has reached state d7. Thus, such a state machine would be recognized as containing the framing bits only, if upon inspection, its flag is raised, and it is presently in any of states d2 through d7.

In the two stage framer, as each of the three hundred eighty-six state machines reaches the terminal state d8 for the first stage bits (i.e., the first 386 time slots of the extended superframe), bits from a time slot in the second group of 386 time slots of the ESF are used for further updating the state of those state machines. Thus, the starting state of the second stage is the terminal state d8 of the first stage. The state update from state d8 in the second stage is either to remain in state d8 if a bit value one is received, or to move to state d9 if a bit value zero is received. From state d9, the four bit state machine can return to state d8 or continue to state d10 depending upon what bit value is received. Updating continues to state d10, state d11, d12, d13, d14, d15 and back to d10 for a state machine receiving the frame synchronization bits. For state machines receiving other data bits, eventually they will be updated to second stage terminal state d16. With a total of sixteen states in the two stages, four bits are sufficient for each state machine.

As aforementioned, when reaching first stage terminal state d8, the bits supplied to the state machine are taken from a different time slot. Preferably, each state machine is provided with bits in the same bit location or time slot of the DS1 frame, but two frames removed. In this manner, if the synchronization bits are in the second group of 386 time slots, all 386 of the state machines will reach state d8, continue on into the second stage, and 385 of the 386 state machines will reach state d16. Only the time slot containing the synch bits will not reach state d16. At the time when the states of all of the state machines are checked, the state machine which did not reach state d16 will be chosen as indicating the synchronization bit location. Of course, if the synch bits are in the first group of 386 time slots, only 385 of the state machines will reach state d8, and those 385 state machines will continue from state d8 through to state d16. Thus, while one of the time slots will be chosen as indicating the synch bit location, the time slot two frames removed from the time slot containing the synch bits will not have been checked. However, this is not a serious problem, as the synch bit location has been found.

Figure 8B:
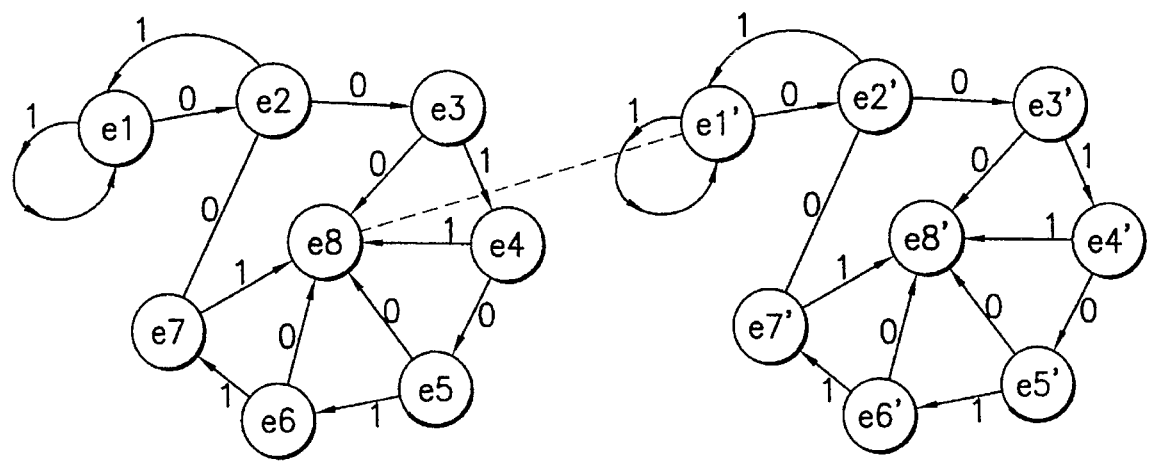
FIG. 8b is a state update diagram showing a second embodiment of the updating of states in a two stage implementation for the ESF frame.

FIG. 8b is shows a state update diagram for a second embodiment of the two stage implementation for the ESF frame. FIG. 8b is nearly identical to FIG. 8a, except that instead of using sixteen-state state machines which are divided into two stages, a two-stage eight-state state machine is utilized. In the eight-state state machine, the states are updated from state e1, to state e2, to states e3–e7, and after state e7, the state machine returns to state e2 and recycles thereafter. In the eight-state state machine, state e8 is the terminal state for the first group of 386 time slots, and the state machines reaching terminal state e8 are then reset to state e1' of the second stage. The second stage is identical to the first stage and includes states e1' through e8' which are identical to states e1 through e8 and are updated in exactly the same manner as states e1 through e8 (the notation being used only to show that bits of a different time slot are being used to update the state). With the eight-state state machine, only three bits are required (i.e., a 386×3 RAM is required). However, at the same time, account must be made of in which stage the state machine is found, as the state machine must be reset upon reaching state e8, but should not be reset upon reaching state e8'. In order to account for the stage, a fourth SRAM bit may be utilized. Alternatively, accounting for the state may be accomplished by setting a flag in the microprocessor. Effectively, then, a tradeoff is established between the SRAM size and the use of microprocessor memory and power.

With the arrangement of FIG. 8b, where the second stage is identical to the first stage, there is a way to guarantee that all bit slots are checked even if the synch pattern is located in the first group of bit slots. Checking of all time slots may be accomplished by randomly assigning the second group of time slots to state machines as the state machines become available. Thus, a single state machine may actually be used more than two times, thus providing a 2+ stage state machine. While this overcomes the problem of a time slot not having been checked, it requires a more complicated mechanism for tracking which time slots have been applied to which state machines so that the synch bit location can be found.

Figure 9:
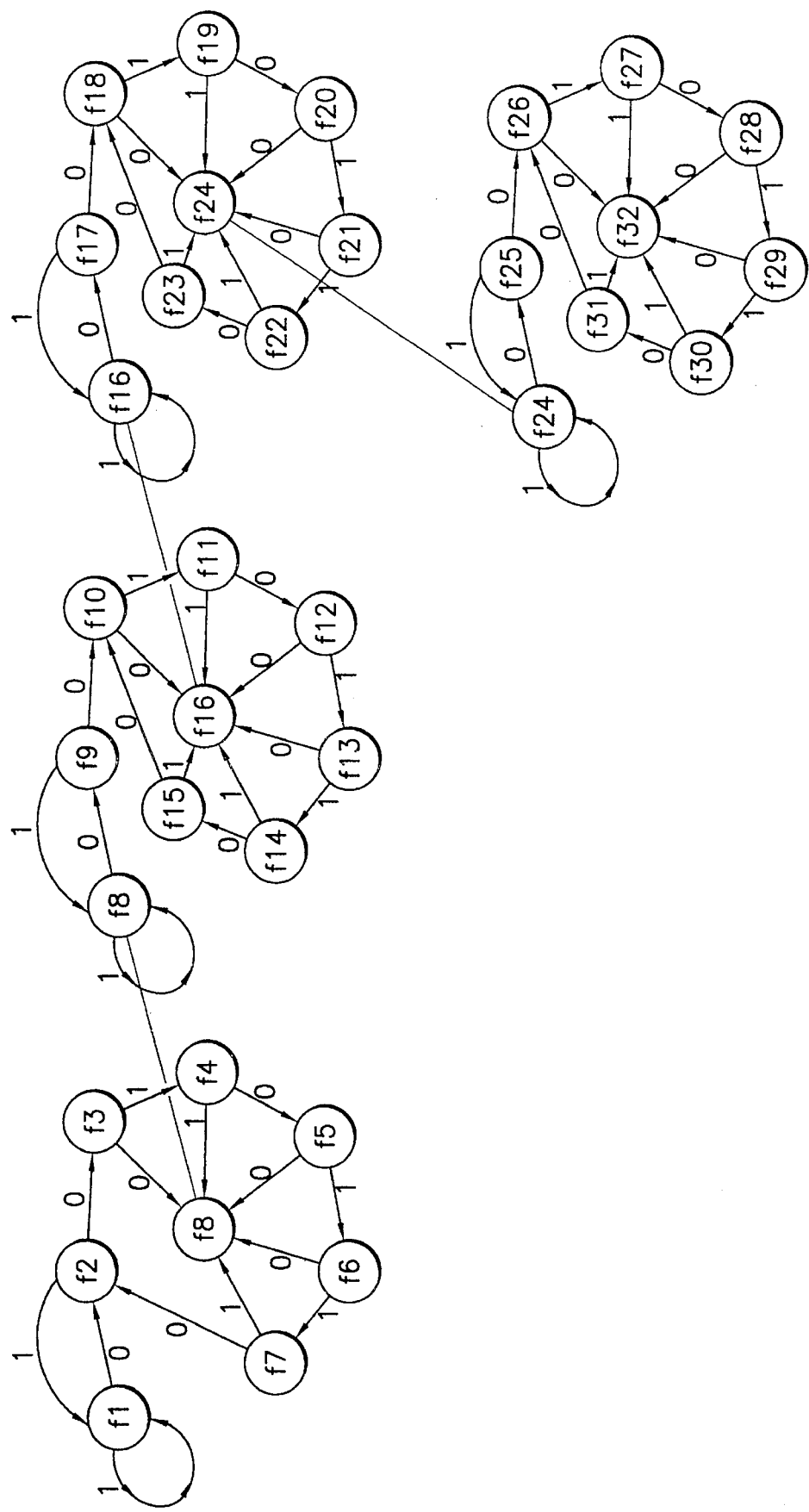
FIG. 9 is a state update diagram showing the updating of states in a four stage implementation for the ESF frame.

FIG. 9 is a state update diagram showing the updating of states in a preferred four stage implementation for the ESF frame. The preferred four stage implementation is substantially identical to the two stage implementation of FIG. 8a, except that only 193 state machines are provided, and each state machine is a five bit machine. Because fewer state machines are utilized, additional stages are required. Thus, each state machine not receiving synch bits starts at state f1, proceeds to be updated until it reaches a first stage terminal state f8, continues into the second stage, proceeds to be updated until it reaches a second stage terminal state f16, continues to the third stage, proceeds to be updated until it reaches a third stage terminal state f24, continues to the fourth stage, and proceeds to be updated until it reaches state f32 of the fourth stage. The state machine receiving the synch bits on the other hand, will not reach the terminal state of the fourth stage, and may not reach the terminal state of even the first stage, depending upon in which of the four groups of 193 time slots it is located. Thus, it is possible that up to three time slots will not have been searched for synch bits. However, as described above with respect to the two-stage state implementations, if it is desired that all time slots be searched for the synch bits, as state machines become available, time slots in the second group of 193 time slots, and then the third and then the fourth groups are consecutively or randomly assigned to available state machines. Thus, a particular state machine may actually be used more than four times, thus providing a 4+ stage state machine.

While the four stage implementation of the invention requires less SRAM space to implement the state machines than a two or one stage implementation, the four stage implementation is also slower than the two stage implementation, which in turn is slower than the one stage implementation. Thus, there is a trade-off between SRAM and framing speed. In addition, it will be appreciated that the multiple stage implementations may be sped up by assigning time slots to state machines as they become randomly available. However, the "cost" of speeding up the system in this manner is circuit complexity, as it becomes necessary to keep track of which time slot has been provided to which state machine.

Figure 10:
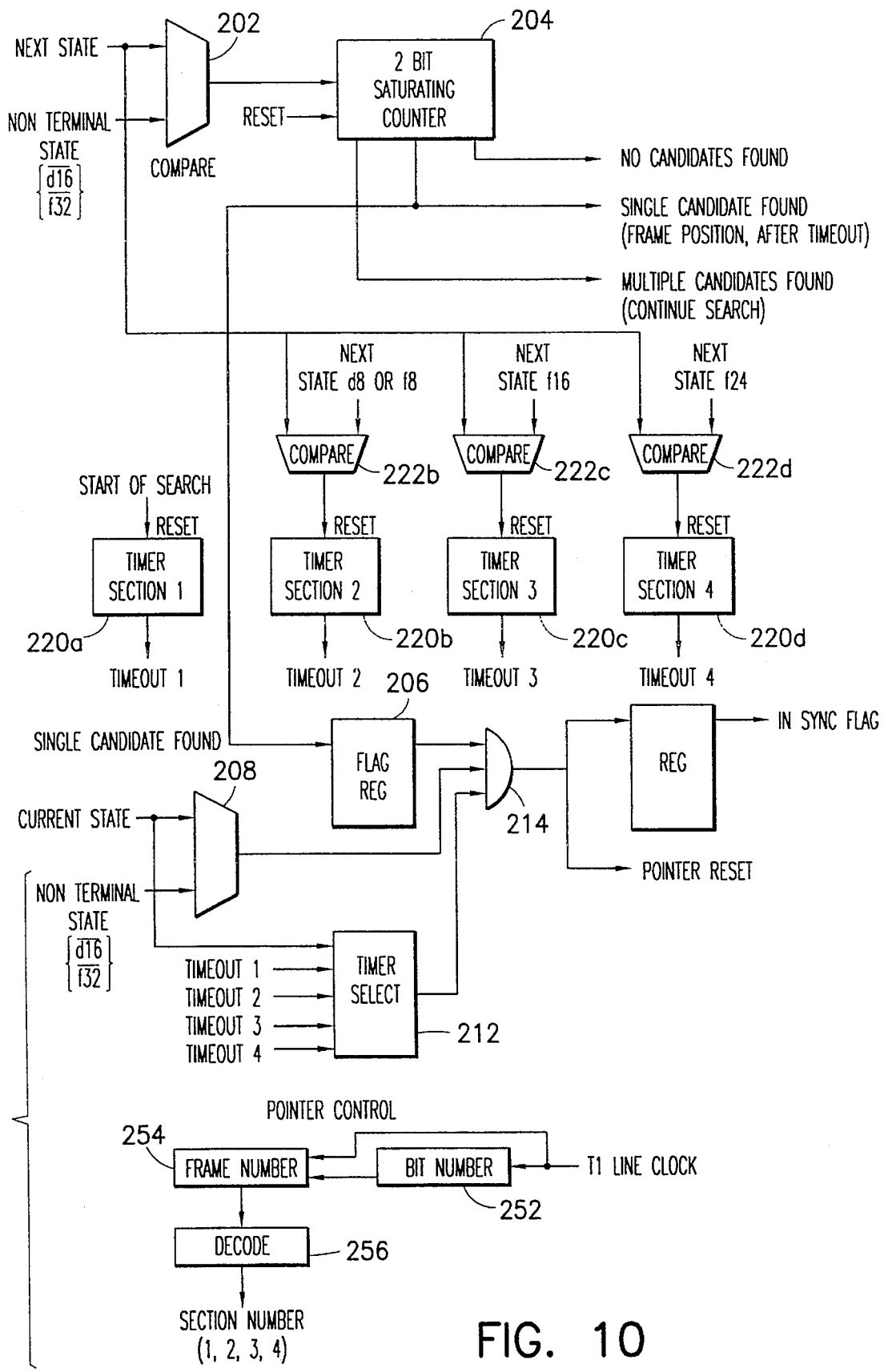
FIG. 10 is a combination block and flow diagram of the pointer and timeout controller of the synchronizer of the invention.

Turning to FIG. 10, a combination block and flow diagram of the pointer and timeout controller 120 (FIG. 3) of the synchronizer of the invention is seen. As described briefly above, the pointer and timeout controller is used generally to control timeouts and to adjust the pointer. Timeouts are used for several purposes, including advancing the state (as described with reference to FIG. 5), declaration of frame position in a multi-section or multistage implementation as described with reference to FIGS. 8a, 8b, and 9. As seen in FIG. 10, the next state value as determined by the synchronizer 106 (see FIG. 3) is compared in a comparator 202 to non-terminal state values $\overline{d16}$ or $\overline{f32}$ only for those bit positions which are being investigated at the time (i.e., for one-half of the bits of a two-stage implentation, and for one-quarter of the bits of a four-stage implementation). If the value of the next state is unequal to the predetermined terminal state values, a counter 204 is incremented. After each scan (e.g., 772 bits), the counter is reset by the pointer control section discussed hereinafter. If the counter is at a count of two or more (saturated), there are multiple candidates for framing synchronization, and the framing algorithm must continue. If no candidates are found, the framing mechanism must be restarted. If a single candidate is found, then a flag is set in flag register 206. On the next scan, the bit position which has a current state (as provided by current state register 112) which is not equal to the terminal states d16 or f32 as determined by comparator 208, is evaluated as the possible synch position. The evaluation is based on whether the timer for the section or stage (as indicated by the timer select multiplexer 212), in which the bit position is located has expired, thereby indicating that two or more full valid framing patterns have been attained. It should be noted that in the final stage, the timer requirement may be relaxed if desired, as no other bit positions which include the synch bits could exist, and as it is most likely that in the final stage multiple valid framing patterns have gone by anyway. The outputs of the flag register 206, the current state comparator 208, and the timer select multiplexer 212 are ANDed at three-input AND gate 214, and if the output is high, the pointer provided by the pointer and timeout control is reset and an In Sync flag is raised for the microprocessor 40.

Returning to the time-out mechanism, it is seen in FIG. 10 that the timers 220a–220d are reset at the start of a search. The timers are preferably set so that the time a predetermined period of time equal at least to the amount of time it takes for two valid framing patterns to be detected by the state machine, regardless of start phase. Any time that a state is reached which causes the state machine to move into another stage, the corresponding timer is reset due to comparators 222b, 222c, or 222d. Thus, for the two-stage embodiment of an ESF framer, timer 220b will be reset at least 385 times, while for the four-stage embodiment, timers 220b, 220c, and 220d will be reset at least 192 times.

Also seen in FIG. 10 is the pointer control mechanism. The pointer control includes two free-running counters which are clocked by the T1 line clock. The first counter 252 is a bit number counter typically counting from 1 to 193, while the second counter 254 is a frame number counter which counts from 1 to 12 in SF mode (1 to 24 in ESF mode). The count of the frame number counter 254 is provided to a decode block 256 which provides a section or stage number. The stage number permits the finite state machine 122 (FIG. 3) to process only those bits which are needed at the particular time to update the state machine.

There have been described and illustrated herein several embodiments of a synchronizer for a telecommunications signal. While particular embodiments of the invention have been described, it is not intended that the invention be limited thereto, as it is intended that the invention be as broad in scope as the art will allow and that the specification be read likewise. Thus, while the invention has been described with particular reference to the synchronization of a DS1 telecommunication signal, it will be appreciated that the invention applies to other types of telecommunication signals which incorporate synchronization bits within their frames. Also, while particular circuitry has been set forth for implementing the invention, it will be appreciated that other circuitry could be utilized to implement the invention. For example, while the state machines are described as being implemented in a look-up table, it will be appreciated that a "hard-wired" circuit could be utilized. Likewise, while the current state of the state machines are described as being stored in SRAM, it will be appreciated that other memory means such as buffers could be utilized. Further, it will be appreciated that while particular state update algorithms have been provided, other state update algorithms could be utilized. For example, by adding additional states, the state update algorithm can more quickly find the synch bits regardless of phase. Also, by adding additional states, the entry location for the loop could be changed, and the size of the loop can be changed; e.g., doubled. Those skilled the art will also appreciate that while time-out mechanisms are preferably provided for purposes of accuracy, they are not required. In fact, by adding additional states to the state update algorithm, time-outs can be eliminated without suffering accuracy. Further yet, it will be appreciated that the while the preferred embodiment of the timing of moving through stages of a multi-stage embodiment was described as permitting each state machine to use bits of another stage (frame location) after reaching a terminal state for a previous frame location, the timing can be changed such that all state machines move from stage to stage together. In addition, the bits of the frame which comprise a stage need not be contiguous; i.e., every other or every fourth bit can be used to comprise a first stage, with interleaved bits used to comprise a second and other stages. It will therefore be appreciated by those skilled in the art that yet other modifications could be made to the provided invention without deviating from its spirit and scope as so claimed.

We claim:

1. A framer for a telecommunications apparatus which receives bits of a telecommunications signal having a frame, said framer comprising:
   a) interface means for receiving said bits of said telecommunications signal;
   b) an x by y bit random access memory (RAM) means, where x is an integer greater than one and y is an integer greater than one, said RAM means for storing, for a plurality (x) of frame locations, y bits, said y bits at each of said plurality of frame locations defining a state;
   c) state update means coupled to said interface means and to said RAM means for changing values of said y bits and hence said states of said plurality of frame bit locations of the RAM means based on a current state at a particular frame location and based on an incoming bit of said telecommunications signal for said particular frame location;
   d) frame location identification means coupled to said state update means for determining a location of an overhead bit in said frame of said telecommunications signal based on said states of said plurality of frame locations after a period of time; and
   e) a fast clock used by said state update means in fetching said current state of a frame position from said RAM means, in calculating a next state based on a value of said incoming bit received as well as from said current state, and inputting said next state of a frame position back into said RAM means, all within a single bit clock cycle of said telecommunications signal.

2. A framer according to claim 1, wherein:
said RAM means is a static random access memory (SRAM).

3. A framer according to claim 1, further comprising:
a microprocessor coupled to said frame location identification means.

4. A framer for a telecommunications apparatus which receives bits of a telecommunications signal having a frame, said framer comprising:
   a) interface means for receiving said bits of said telecommunications signal;
   b) an x by y bit silicon memory storage means, where x is an integer greater than one and y is an integer greater than one, said memory storage means for storing, for a plurality (x) of frame locations, y bits, said y bits at each of said plurality of frame locations defining a state;
   c) state update means coupled to said interface means and to said silicon memory storage means for changing values of said y bits and hence said states of said plurality of frame bit locations of the memory storage means based on a current state at a particular frame location and based on an incoming bit of said telecommunications signal for said particular frame location, with said state update means generating a terminal state value representing a terminal state for all frame bit locations which over time are not receiving bits constituting a predetermined framing sequence; and
   d) frame location identification means coupled to said state update means for determining a location of an overhead bit in said frame of said telecommunications signal based on said states of said plurality of frame locations after a period of time.

5. A framer according to claim 4, wherein:
said telecommunications signal is a DS1 signal having the overhead bit.

6. A framer according to claim 5, wherein:
said overhead bit in a plurality of frames of said DS1 signal comprises at least signalling synchronization (Fs) bits.

7. A framer according to claim 6, wherein:
said silicon memory means comprises a substantially Int (193/I) x 4xI bit RAM, where I is a positive integer, and Int (193/I) indicates an integer rounding up of (193/I).

8. A framer according to claim 7, wherein:
said overhead bit in the plurality of frames of said DS1 signal comprises both signalling synchronization (Fs) bits and frame synchronization (Ft) bits.

9. A framer according to claim 5, wherein:
said frame of said telecommunications signal is an extended superframe format (ESF) mode frame which receives at least one overhead bit every 772 bits of said telecommunications signal, and said ESF mode frame is divided into a plurality (s) of stages, wherein bits received in a first frame position of a first stage of said ESF mode frame are provided to and are used by said state update means during a first period of time, and bits received in a second frame position from a second stage of said ESF mode frame are provided to and are used by said state update means at a second period of time different than said first period of time.

10. A framer according to claim 9, wherein:
said ESF mode frame is divided into four stages,
said silicon storage means is either a 193×4 RAM or a 193×5 RAM.

11. A framer according to claim 9, further comprising:
timeout control means for generating a timeout for said state update means, wherein said timeout forces said state update means to update a state to said terminal state.

12. A framer according to claim 4, wherein:
said frame location identification means comprises a comparator which compares values of current states of each of said plurality of frame locations to said terminal value.

13. A framer according to claim 12, wherein:
said frame location identification means further comprises a counter coupled to said comparator which indicates a number of candidates of frame locations containing said overhead bit of said frame.

14. A framer according to claim 4, further comprising:
a plurality of said interface means, a plurality of said silicon memory storage means, a plurality of said state update means coupled to respective of said plurality of said silicon memory storage means and receiving bits from respective of said plurality of said interface means, a plurality of said frame location identification means coupled to respective of said plurality of state update means, and a microprocessor coupled to said plurality of frame location identification means.

15. A framer according to claim 4, wherein:
said frame location identification means comprises a comparator which compares values of next states of each of said plurality of frame locations to said terminal value.

16. A framer according to claim 4, wherein:
said frame location identification means comprises a comparator which compares values of current states of each of said plurality of frame locations to non-terminal state values.

17. A framer according to claim 4, wherein:

said frame location identification means comprises a comparator which compares values of next states of each of said plurality of frame locations to non-terminal state values.

18. A framer for a telecommunications apparatus which receives bits of a telecommunications signal having a frame, said framer comprising:

a) interface means for receiving said bits of said telecommunications signal;

b) an x by y bit silicon memory storage means, where x is an integer greater than one and y is an integer greater than one, said memory storage means for storing, for a plurality (x) of frame locations, y bits, said y bits at each of said plurality of frame locations defining a state;

c) state update means coupled to said interface means and to said silicon memory storage means for changing values of said y bits and hence said states of said plurality of frame bit locations of the memory storage means based on a current state at a particular frame location and based on an incoming bit of said telecommunications signal for said particular frame location, and d) frame location identification means coupled to said state update means for determining a location of an overhead bit in said frame of said telecommunications signal based on said states of said plurality of frame locations after a period of time, wherein said frame is divided into a plurality of stages, wherein bits received in a first frame position of a first stage of said frame are provided to and are used by said state update means during a first period of time, and bits received in a second frame position from a second stage of said frame are provided to and are used by said state update means at a second period of time different than said first period of time.

19. A framer for a telecommunications apparatus which receives bits of a DS1 telecommunications signal having a frame with an overhead bit, said framer comprising:

a) interface means for receiving said bits of said telecommunications signal;

b) an x by y bit silicon memory storage means, where x is equal to Int(193/I) where I is a positive integer greater than one, and Int(193/I) indicates an integer rounding up of (193/I), and y is equal to 4I, said memory storage means for storing, for x frame locations, y bits, said y bits at each of said x frame locations defining a state;

c) state update means coupled to said interface means and to said silicon memory storage means for changing values of said y bits and hence said states of said x frame locations of the memory storage means based on a current state at a particular frame location and based on an incoming bit of said telecommunications signal for said particular frame location; and d) frame location identification means coupled to said state update means for determining a location of an overhead bit in said frame of said telecommunications signal based on said states of said x frame locations after a period of time.

20. A framer according to claim 19, wherein:

said frame of said telecommunications signal is an extended superframe format (ESF) mode frame which receives at least one overhead bit every 772 bits of said telecommunications signal.

21. A framer according to claim 20, wherein:

said ESF mode frame is divided into four stages.

22. A framer according to claim 20, further comprising:

timeout control means for generating a timeout for said state update means, wherein said timeout forces said state update means to update a state to a terminal state.

* * * * *